United States Patent
Tjahjadi et al.

[11] Patent Number: 5,863,974
[45] Date of Patent: *Jan. 26, 1999

[54] FLAME RETARDANT POLYAMIDE COMPOSITION

[75] Inventors: Mahari Tjahjadi, Evansville; Robert R. Gallucci; Kirk J. Blackburn, both of Mt. Vernon, all of Ind.; Eric R. George, Slingerlands, N.Y.

[73] Assignee: General Electric Company, Pittsfield, Mass.

[*] Notice: This patent issued on a continued prosecution application filed under 37 CFR 1.53(d), and is subject to the twenty year patent term provisions of 35 U.S.C. 154(a)(2).

[21] Appl. No.: 790,012

[22] Filed: Jan. 28, 1997

[51] Int. Cl.$^6$ ............................................. C08K 3/32
[52] U.S. Cl. ......................................... 524/412; 524/417
[58] Field of Search .................... 524/412, 469, 524/468, 494, 417, 316

[56] References Cited

U.S. PATENT DOCUMENTS

| | | |
|---|---|---|
| 2,465,319 | 9/1949 | Whinfield et al. . |
| 3,047,539 | 7/1962 | Pengilly . |
| 3,228,898 | 1/1966 | Illing et al. ............................ 524/417 |
| 3,479,319 | 11/1969 | Hergenrother ........................ 524/417 |
| 3,808,180 | 4/1974 | Owens . |
| 4,000,109 | 12/1976 | Smith et al. . |
| 4,043,971 | 8/1977 | Wurmb et al. . |
| 4,052,356 | 10/1977 | Breitenfellner et al. . |
| 4,096,202 | 6/1978 | Farnham et al. . |
| 4,180,494 | 12/1979 | Fromuth et al. . |
| 4,260,693 | 4/1981 | Liu . |
| 4,292,233 | 9/1981 | Binsack et al. . |
| 4,296,021 | 10/1981 | Wambach . |
| 4,301,058 | 11/1981 | Neukirchen et al. ................. 524/412 |
| 4,376,188 | 3/1983 | Khattab ................................. 524/606 |
| 4,421,888 | 12/1983 | Okada . |
| 4,456,723 | 6/1984 | Breitenfellner et al. . |
| 4,521,560 | 6/1985 | Breintenfellner . |
| 4,544,695 | 10/1985 | Myers .................................. 524/417 |
| 4,559,372 | 12/1985 | Giroud-Abel . |
| 4,636,544 | 1/1987 | Hepp . |
| 4,687,802 | 8/1987 | Hepp . |
| 4,717,751 | 1/1988 | Yate, III et al. . |
| 4,935,272 | 6/1990 | Lebeouf .............................. 524/417 |
| 4,939,237 | 7/1990 | Besso .................................. 524/417 |
| 4,981,897 | 1/1991 | Kawai et al. ........................ 524/417 |
| 4,981,898 | 1/1991 | Bassett ................................ 524/417 |
| 5,026,760 | 6/1991 | Liu . |
| 5,149,734 | 9/1992 | Fisher et al. . |
| 5,162,412 | 11/1992 | Liu . |
| 5,367,011 | 11/1994 | Walsh .................................. 524/417 |
| 5,441,997 | 8/1995 | Walsh et al. ........................ 524/417 |
| 5,554,674 | 9/1996 | Hamilton ............................ 524/417 |

FOREIGN PATENT DOCUMENTS

| | | | |
|---|---|---|---|
| 82 382 | 6/1983 | European Pat. Off. ............... 524/417 |
| 39-14517 | 7/1964 | Japan ................................... 524/417 |

OTHER PUBLICATIONS

Tracking Index of Flame Retarded Nylon and PBT by R.L. Markezich of Occidential Chemical Corp, Technology Center, 2801 Long Road, Grand Island, NY 14072, U.S.A.
Deck Plus Digest, Fall 1994, vol. 7—No. 1—Occidential Chemical Corp., Ronald L. Markezich, Editor, pp. 1–6.

*Primary Examiner*—Veronica P. Hoke

[57] ABSTRACT

Flame retarded resin molding compositions with enhanced electrical properties comprising a polyamide resin, a flame retarding amount of a halogenated flame retardant, a fiber glass and/or mineral filler, and an effective amount of a pyro/polyphosphate, and optionally including an olefinic polymer for enhancing electrical properties.

21 Claims, No Drawings

FLAME RETARDANT POLYAMIDE COMPOSITION

FIELD OF THE INVENTION

This invention relates to flame retarded resin molding compositions having a improved electrical properties.

BACKGROUND OF THE INVENTION

Resins such as polyamide-6,6 are used in molding compositions due to its many excellent properties, i.e. strength, solvent resistance, etc. In applications which require good electrical properties, molded parts may be exposed to severe conditions, such as exposure to electrical discharge or to excessive current leakage across its surface. These conditions require not only that the molded part have flame resistance, but also that the molded part have a high degree of resistance to carbonization upon exposure to high voltage, i.e. good track resistance and a high degree of resistance to electrical discharge.

However, it has been a problem that flame retarded polyamide resins have poor track resistance compared to the non-flame retarded resin. U.S. Pat. No. 4,559, 372 to Giroud-Abel describes a composition of comprising (i) a polyamide, (ii) a fireproofing amount of red phosphorus, and (iii) an effective amount of at least one lanthanide compound as having improved electrical properties. Other materials mentioned include the incorporation of cupric oxide and cadmium oxide for improved arc resistance. This focus of this patent is on the utilization of red phosphorus.

Hence, it is desirable to provide additional ingredients which can enhance the track resistance of glass fiber polyamide composition, especially flame retardant polyamide compositions.

SUMMARY OF THE INVENTION

It is an object of the present invention to provide flame retarded, reinforced polyamide resin molding compositions, likewise, articles molded from them which have improved electrical properties.

Another object of the present invention is to provide flame retarded polyamide resin molded articles and the molding compositions which are suitable for molded electrical devices, such as electrical outlets, circuit breakers, switches, fuse holders, lamp sockets, distributor caps, or ignition coils.

According to the present invention, there are provided flame retarded resin molding compositions with enhanced electrical properties, particularly track resistance, which comprise a polyamide, a flame retarding amount of a halogenated flame retardant glass and/or, mineral filler, and an effective amount of a pyro/polyphosphate for improving the electrical properties. The pyro/polyphosphate may be a metal pyrophosphate, a metal polyphosphate, a metal acid pyrophosphate, or metal acid polyphosphate.

In accordance with another aspect of the present invention, an olefinic polymer is included in the composition, in addition to the pyro/polyphosphate for enhancing the electrical properties.

DESCRIPTION OF THE PREFERRED EMBODIMENTS

In accordance with the principles of the present invention, the combination of ingredients are selected so that the compositions are suitable for electrical devices and have improved Comparative Tracking Index (CTI). CTI is typically measured by UL-746A or ASTM-D3638-85 or IEC-112-3rd Publication. The method of this test is intended to indicate the relative behavior of solid electrical insulating materials with regard to their susceptibility to surface tracking when exposed under electrical stress, to water, and other contaminants from the surroundings. This method is especially suitable for testing synthetic resin moldings. Comparative Tracking Index; the voltage, as determined under the conditions specified in this test method, which will cause failure with the application of 50 drops of electrolyte to the specimen, is used as a measure of the susceptibility of the material to tracking.

Preferably the CTI of the final composition is greater than or equal to about 400, and preferably greater than about 450 volts. Typically neat polyamide 6,6 has a CTI value of about 500 to about 600 volts but the addition of flame retardants and glass fibers tend to decrease the CTI value to about 275 to 350 volts. Hence, it is desirable to select the remaining ingredients so as to not detract from the desirable flame retardancy and mechanical properties but enhance the CTI of the final composition.

Preferably, the desired flame retardancy is V-0 according to Underwriters Laboratories Test No. 94. In additional to high CTI and flame retardancy, important properties include good mechanical properties, good processability, i.e. short molding cycle times, good flow, and good insulation properties. Flame retardants and reinforcing materials such as glass fibers are desirably separate components present in the resin to enhance the flame retardant and strength properties, respectively.

In accordance with the principles of the present invention, the resin composition includes a pyro/polyphosphate selected from the group consisting of metal pyrophosphates, metal polyphosphates, metal acid pyrophosphates, metal acid polyphosphates, and mixtures thereof. Preferably the pyro/polyphosphate has the formula (I):

$$M^z_x H_y P_n O_{3n+1} \tag{I}$$

wherein M is a metal, x is a number from 1 to 12, y is a number from 0 to 12, n is a number from 2 to 10, z is a number from 1 to 5 and the sum of (xz)+y is equal to n+2. M is preferably a Group IA, IIA, IB or IIB metal and more preferably sodium or potassium.

These compounds include, for example, pyrophosphates of the formula $Na_3HP_2O_7$; $K_2H_2P_2O_7$; $Na_3H_2P_3O_{10}$; $KNaH_2P_2O_7$ and $Na_2H_2P_2O_7$ or sodium hexameta phosphate, $Na_8P_6O_{19}$. Typically, the metal pyro/polyphosphates are hydrates and may be in powder form. Sodium acid pyrophosphate is the most preferred.

The pyro/polyphosphate is added to the flame retarded molding compositions in an amount effective to increase track resistance but not in such amount that other essential properties of the molding composition are substantially degraded. Preferably, the final composition comprises from about 0.5 to about 40, and more preferably from about 0.5 to about 20 percent of the pyro/polyphosphate for improving the CTI.

Additionally, it has been found that olefinic type polymers may be added to provide enhancement of the CTI. Typical olefinic type polymers are the addition polymers of olefins. Suitable olefins include ethylene, propylene, butylene, hexene and octene or their copolymers.

Polyolefins may be high density polyethylene (d=above 0.94), low density polyethylene (d=about 0.92), linear low density polyethylene (d=0.916–0.940) or polypropylene. The olefin polymers may be copolymers, including ethylene-propylene or ethylene-butylene copolymers and those containing acid or ester structural units derived, for instance, from acrylic acid, methacrylic acid, acrylic esters, methacrylic esters, alkyl vinyl esters or the like, most often in the amount of about 5–25%, preferably 10–25 percent by weight. Most preferred are copolymers of ethylene with ethyl acrylate or methacrylate.

Preferably, olefinic type polymers are included in the final composition in an amount from about 1 to about 10, and more preferably from about 3 to about 7 percent by weight of the final composition as an effective amount to improve the CTI.

Included in the resin compositions of the present invention are mineral filler materials which act with the pyro/polyphosphates to enhance the track resistance. The preferred mineral fillers enhance the CTI. Typical mineral fillers include metal sulfates, micas, clays such as alumino silicates and alumino magnesium silicate, talcs, glass flake, wollastonite, metal oxides such as titanium dioxide, zinc sulfide, ground quartz, and the like. Preferred mineral fillers are the talc, clays and metal sulfates. Typical silicates include calcium silicates such as Wollastonite; aluminum silicates such as Kaolin which is a clay material composed of fine-grained mineral kaolinite; hydrated magnesium silicates known as Talc; silica and alumina type mineral materials, and Mica which is a hydrous aluminosilicate material. Clay is a hydrated aluminum silicate generalized by the formula $Al_2O_3SiO_2 \cdot xH_2O$. Talc is a preferred mineral filler.

The metal sulfate salts as well as their hydrates are a preferred mineral filler. Preferred metal sulfate salts are the Group IA and Group IIA metal sulfates with barium, calcium and magnesium sulfates being preferred.

Barium sulfate which is non-toxic and insoluble in dilute acids is especially preferred. Barium sulfate may be in the form of the naturally occurring barytes or as synthetically derived barium sulfate using well known synthetic techniques. The particle size may vary from 0.5 to 50 microns, preferably from 1 to 15 microns and most preferably 8 microns.

In most applications, the pyro/polyphosphates, mineral filler, and reinforcing material such as glass fibers, comprise the filler material, and desirably represent 5 to 70% and preferably from 10 to 50% of the total weight percent of the composition. Based on the total weight of the composition, reinforcement material is preferably present in an amount from 5 to 30 percent by weight, mineral filler in an amount from 3 to 30 percent by weight and pyro/polyphosphate in an amount from 0.5 to 20 percent by weight.

To provide desired stiffness, the reinforcing material is desirably a glass fiber reinforcing agent. As previously discussed, the inclusion of glass fiber may deleteriously reduce the CTI. Hence, other constituents are desirable selected to enhance the CTI.

The glass fiber or filamentous glass is employed as a reinforcement in the present compositions. For compositions ultimately to be employed for electrical uses, it is preferred to use fibrous glass filaments comprised of borosilicate glass that is relatively soda-free. This is known as "E" glass. The filaments are made by standard processes, e.g., by steam or air blowing, flame blowing and mechanical pulling. The preferred filaments for plastic reinforcement are made by mechanical pulling. The filament diameters preferably range from about 3 to 30 microns.

In preparing the molding compositions it is convenient to use the filamentous glass in the form of chopped strands of from about 1/8" to about 1/2" long. In articles molded from the compositions on the other hand, even shorter lengths will be encountered because, during compounding considerable fragmentation will occur. Glass filaments are typically single fibers with other fiber forms including bundled fibers such as yarns, ropes or rovings.

The amount of flame-retardant additive should be present in an amount at least sufficient to reduce the flammability of the polyamide resin, preferably to a UL94 V-0 rating. The amount will vary with the nature of the resin and with the efficiency of the additive. In general, however, the amount of additive will be from 2 to 20 percent by weight based on the weight of resin. A preferred range will be from about 5 to 15 percent.

Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly (haloaryl acrylate), poly (haloaryl methacrylate), or mixtures thereof. Poly (haloaryl acrylate) is preferred with the most preferably being poly (pentabromobenzyl acrylate). PBB-PA has been known for some time, and is a valuable flame-retardant material, useful in a number of synthetic resins. PBB-PA is prepared by the polymerization of pentabromobenzyl acrylate ester (PBB-MA). The PBB-PA polymeric flame-retardant material is incorporated into the synthetic resin during processing to impart flame retardant characteristics.

Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins. Other aromatic carbonate flame retardants are set forth in U.S. Pat. No. 4,636,544 to Hepp.

The flame retardants are typically used with a synergist, particularily inorganic antimony compounds. Such compounds are widely available or can be made in known ways. Typical, inorganic synergist compounds include $Sb_2O_5$; $SbS_3$; and the like. Especially preferred is antimony trioxide ($Sb_2O_3$). Synergists such as antimony oxides, are typically used at about 0.5 to 15, and more preferably from 1 to 6 percent by weight based on the weight percent of resin in the final composition.

Also, the final composition may contain polytetrafluoroethylene (PTFE) type resins or copolymers used to reduce dripping in flame retardant thermoplastics.

Suitable polyamide components include polyamide-6, polyamide-6,6, polyamide-11, polyamide-12, polyamide-4,6, polyamide-6,10 and polyamide-6,12, as well as polyamides prepared from terephthalic acid and/or isophthalic acid and trimethylhexamethylenediamine; from adipic acid and 10 m-xylylenediamines; from adipic acid, azelaic acid, 2,2-bis-(p-aminocyclohexyl) propane, and from terephthalic acid and 4, 4'-diaminodicyclohexylmethane. Mixtures and/or copolymers of two or more of the foregoing polyamides or prepolymers thereof, respectively, are also within the scope of the present invention.

Furthermore, the polyamides may be made by any known method, including the polymerization of a monoamino monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above, together with substantially equimolar proportions of a diamine and a dicarboxylic acid. The dicarboxylic acid may be used in the form of a functional derivative thereof, for example, a salt, an ester or acid chloride.

A detailed description of polyamides and polyamide presursor materials is provided in U.S. Pat. No. 4,755,566 to Yates. Other useful polyamides often referred to as "Nylons" are disclosed in U.S. Pat. Nos. 4,732,938 to Grant et al., 4,659,760 to Van der Meer, and 4,315,086 to Ueno et al., each also incorporated herein by reference. The polyamide used may also be one or more of those referred to as "toughened nylons", which are often prepared by blending one or more polyamides with one or more polymeric or copolymeric elastomeric toughening agents. Examples of these types of materials are given in U.S. Pat. Nos. 4,174,358; 4,474,927; 4,346,194; 4,251,644; 3,884,882; 4,147,740; all incorporated herein by reference, as well as in a publication by Gallucci et al, "Preparation and Reactions of Epoxy-Modified Polyethylene", J.APPL.POLY.SCI., V.27, PP, 425–437 (1982).

The preferred polyamides for this invention are polyamide-6; 6,6; 11 and 12, with the most preferred being polyamide-6,6.

The polyamides used herein preferably have an intrinsic viscosity of from about 0.4 to about 2.0 dl/g as measured in a 60:40 m-cresol mixture or similar solvent at 23°–30° C.

Blends of various polyamide resins as the polyamide component can comprise from about 1 to about 99 parts by weight preferred polyamides as set forth above and from about 99 to about 1 part by weight other polyamides based on 100 parts by weight of both components combined.

Additional ingredients may include other thermoplastic resins in an amount up to about 50 percent by weight based on the weight of the formulation. Such other suitable thermoplastic resins which may be used include polyesters, acrylic and methacrylic polymers or copolymers; epoxy resins; polycarbonates; polyetherimides; phenylene oxide based resins such as polyphenylene oxide and blends of polyphenylene oxide and styrene resins; polyaryl ethers; polyphenylene sulfides; polyetherketones, aliphatic polyketones, polysulfones; and ordered aromatic copolymers especially liquid crystalline polymers.

Such additional resin compositions may include, an effective amount of any of the known impact modifiers useful for polyamides and polyamide blends. These may be added to the compositions by themselves or in combination with the aforementioned resins. The preferred impact modifiers generally comprise an anhydride or carboxylic acid modified olefinic rubber.

Other ingredients employed in low amounts, typically less than 5 percent by weight of the total composition, include stabilizers, lubricants, colorants, plasticizers, nucleants, antioxidants and UV absorbers. These ingredients should be selected so as not to deleteriously affect the desired properties of the molded resin.

Although it is not essential, best results are obtained if the ingredients are precompounded, pelletized and then molded. Precompounding can be carried out in conventional equipment. For example, after predrying the polyamide resin, other ingredients, and, optionally, other additives and/or reinforcements, a single screw extruder is fed with a dry blend of the composition. On the other hand, a twin screw extrusion machine can be fed with resins and additives at the feed port and reinforcement down stream.

Portions of the blend can be precompounded and then, extruded with the remainder of the formulation, and cut or chopped into molding compounds, such as conventional granules, pellets, etc. by standard techniques.

The compositions can be molded in any equipment conventionally used for thermoplastic compositions. For example, good results will be obtained in an injection molding machine, e.g. of the 80 ton Van Dorn type, with conventional temperatures which depend on the particular thermoplastic utilized. If necessary, depending on the molding properties of the polyamide, the amount of additives and/or reinforcing filler and the rate of crystallization of the polyamide component, those skilled in the art will be able to make conventional adjustments in molding cycles to accommodate the composition.

Flammability tests were performed with the procedure of Underwriter's Laboratory Bulletin 94 entitled "Combustion Tests for Classification of Materials, UL-94." According to this procedure, the materials were classified as either UL-94 V-0, UL-94 V-1 or UL-94 V-2 on the basis of the tests results obtained for ten samples. The criteria for each of these flammability classifications according to UL-94, are, briefly, as follows:

V-0: the average period of flaming and /or smoldering after removing the igniting flame should not exceed five seconds and none of the samples should produce drips of particles which ignite absorbent cotton.

V-1: the average period of flaming and/or smoldering after removing the igniting flame should not exceed twenty-five seconds and none of the samples should produce drips of particles which ignite absorbent cotton.

V-2: the average period of flaming and/or smoldering after removing the igniting flame should not exceed twenty-five seconds and the samples may produce drips of burning particles which ignite absorbent cotton.

The following examples illustrate the preparation of certain compositions within the scope of this invention. They are not to be construed to limit the invention in any manner whatsoever. All parts, except as otherwise indicated, are by weight.

EXAMPLES

The formulations shown below in Tables 1 were preblended and extruded in a 2.5 inch 30:1 L/D HPM Single Screw Extruder. The extrudate was cooled through a water bath prior to pelletizing. Test parts were injection molded in a 80 ton Van Dorn molding machine. The pellets were dried for 3–4 hours at 250° F. in a forced air circulating oven prior to injection molding.

The control experiments labeled A-E showed low CTI. Compared to the control experiments, the formulations of the invention, labeled 1–7, containing pyro/polyphosphates and sulfates or minerals showed improved CTI. The pyro/polyphosphate are metal pyrophosphates, metal polyphosphates, metal acid pyrophosphates, or metal acid polyphosphates.

Formulation A was polyamide 6,6 resin plus 30 percent glass plus flame retardant without ethylene copolymer and fillers. The flame retardant system was poly (pentabromobenzyl acrylate) and $Sb_2O_3$. The CTI was 275 volts.

Formulation B was Formulation A with 10% less glass and 25% talc. Talc showed beneficial effects on the CTI which was improved to 350 volts.

Formulation 1 was Formulation B with 4% less talc and replaced by sodium acid pyrophosphate (SAPP). Talc and SAPP combination showed beneficial effects on the CTI which was improved to 375 volts.

Formulation 2 was Formulation 1 with 4.5% less talc and replaced by ethylene ethyl acrylate (EEA). Talc and EEA combination showed beneficial effects on the CTI which was improved to 425 volts.

Formulation 3 was similar to Formulation 1 with 4.5% added ethylene ethyl acrylate (EEA). Talc, SAPP, and EEA combination showed beneficial effects on the CTI which was improved to 475 volts.

Formulation C was polyamide 6 resin plus 30 percent glass plus flame retardant without ethylene copolymer and fillers. The flame retardant system was bromo acrylate with antimony synergist. The CTI was 300 volts.

Formulation D was Formulation C with 10% less glass and 25% talc. Talc showed beneficial effects on the CTI which was improved to 400 volts.

Formulation F was Formulation E with 10% less glass and 25% talc. Talc showed beneficial effects on the CTI which was improved to 375 volts.

Formulation 6 was Formulation F with 4% less talc and replaced by sodium acid pyrophosphate (SAPP). Talc and SAPP combination showed beneficial effects on the CTI which was improved to 425 volts.

Formulation 7 was similar to Formulation 6 with 4.5% added ethylene ethyl acrylate (EEA). Talc, SAPP, and EEA combination showed beneficial effects on the CTI which was improved to 475 volts.

Articles which are molded from the formulated resins are suitable for use in or as electrical devices such as electrical outlets, circuit breakers, switches, fuse holders, lamp sockets, distributor caps, enclosures, or ignition coils. Such articles may be formed by conventional molding techniques.

TABLE 1

| Material | A | B | 1 | 2 | 3 | C | D | 4 | 5 | E | F | 6 | 7 |
|---|---|---|---|---|---|---|---|---|---|---|---|---|---|
| RESIN | | | | | | | | | | | | | |
| Polyamide 6,6 - (1) | 58.85 | 43.85 | 43.85 | 43.85 | 38.85 | | | | | | | | |
| Polyamide 6 - (2) | | | | | | 58.85 | 43.85 | 43.85 | 38.85 | 56.60 | 41.60 | 41.60 | 36.60 |
| GLASS | | | | | | | | | | | | | |
| E-Glass - (3) | 30.00 | 20.00 | 20.00 | 20.00 | 20.00 | 30.00 | 20.00 | 20.00 | 20.00 | 30.00 | 20.00 | 20.00 | 20.00 |
| FR + SYNERGIST | | | | | | | | | | | | | |
| Br. Acrylate - (4) | 8.00 | 8.00 | 8.00 | 8.00 | 8.00 | 8.00 | 8.00 | 8.00 | 8.00 | | | | |
| $Sb_2O_3$ Conc. - (5) | 3.00 | 3.00 | 3.00 | 3.00 | 3.50 | 3.00 | 3.00 | 3.00 | 3.00 | | | | |
| Br. Epoxy + $Sb_2O_3$ Conc. - (6) | | | | | | | | | | 13.25 | 13.25 | 13.25 | 13.25 |
| Mineral | | | | | | | | | | | | | |
| Talc | | 25.00 | 21.00 | 20.50 | 21.00 | | 25.00 | 21.00 | 21.00 | | 25.00 | 21.00 | 21.50 |
| SAPP-(7) | | | 4.00 | | 4.00 | | | 4.00 | 4.00 | | | 4.00 | 4.00 |
| Others | | | | | | | | | | | | | |
| EEA - (8) | | | | 4.50 | 4.50 | | | | 4.50 | | | | 4.50 |
| Irganox TM 1076 - (9) | 0.15 | 0.15 | 0.15 | 0.15 | 0.15 | 0.15 | 0.15 | 0.15 | 0.15 | 0.15 | 0.15 | 0.15 | 0.15 |
| | 100.00 | 100.00 | 100.00 | 100.00 | 100.00 | 100.00 | 100.00 | 100.00 | 100.00 | 100.00 | 100.00 | 100.00 | 100.00 |
| UL94 @ 1.6mm | V-2 | V-2 | V-1 | V-1 | V-1 | V-2 | V-2 | V-1 | V-1 | V-2 | V-2 | V-1 | V-1 |
| CTI Volts | 275 | 350 | 375 | 425 | 475 | 300 | 4 00 | 475 | 500 | 300 | 375 | 425 | 475 |

(1) Polyamide 6,6 resin
(2) Polyamide 6 resin
(3) 14 micron diameter glass
(4) Poly(pentabromobenzyl Acrylate) Mw 15,000
(5) 85% $Sb_2O_3$ and 15% olefinic binder
(6) 75% Brominated Epoxy and 25% $Sb_2O_3$ concentrate
(7) Sodium Acid Pyrophosphate
(8) Polycopolymer of Ethylene with 18% Ethyl Acrylate
(9) Hindered Phenol Anti Oxidant Formulation 4 was Formulation D with 4% less talc and replaced by sodium acid pyrophosphate (SAPP). Talc and SAPP combination showed beneficial effects on the CTI which was improved to 475 volts.

Formulation 5 was similar to Formulation 4 with 4.5% added ethylene ethyl acrylate (EEA). Talc, SAPP, and EEA combination showed beneficial effects on the CTI which was improved to 475 volts.

Formulation E was polyamide 6 resin plus 30 percent glass plus flame retardant without ethylene copolymer and fillers. The flame retardant system was bromo epoxy with antimony synergist. The CTI was 300 volts.

What is claimed is:

1. A flame retarded resin molding composition with enhanced electrical properties comprising a polyamide resin, a flame retarding amount of a halogenated flame retardant including an antimony synergist, fiber glass and/or mineral filler, and an effective amount of a pyro/polyphosphate selected from the group consisting of metal pyrophosphates, metal polyphosphates, metal acid pyrophosphates, metal acid polyphosphates and mixtures thereof, additionally including an effective amount of an polyolefin polymer for improving electrical properties of articles molded from said composition wherein the CTI of the molder article is greater than about 400 volts wherein, based on the total weight of the composition, said filler content comprises from 10 to 50% of the total weight percent of the composition and consists essentially of said glass fiber, mineral filler, and pyro/polyphosphate wherein said glass fiber is present in an amount from 5 to 30 percent by weight, mineral filler is present in an amount from 3 to 30 percent by weight and said pyro/polyphosphate is present in an amount from 0.5 to 20 percent by weight, said olefinic polymer is present in an amount from about 3 to about 7 percent by weight wherein said weight percents are based on the total weight of said composition.

2. A flame retarded resin molding composition according to claim 1 wherein said pyro/polyphosphate has the formula: $M^Z_xH_yP_nO_{3n+1}$, wherein M is a metal, z is from 1 to 5, x is a number from 1 to 12, y is a number from 0 to 12, n is a number from 2 to 10.

3. A flame retarded resin molding composition according to claim 2 wherein said improved electrical properties comprise improved Comparative Tracking Index (CTI).

4. A flame retarded resin molding composition according to claim 2 wherein M is a is a Group IA, IIA, IB or IIB metal.

5. A flame retarded resin molding composition according to claim 2 wherein said pyro/polyphosphate is sodium acid pyrophosphate.

6. A flame retarded resin molding composition according to claim 2 wherein M is sodium or potassium.

7. A flame retarded resin molding composition according to claim 1 wherein said polyamide is selected from the group consisting of polyamide-6; 6,6; 11 and 12.

8. A flame retarded resin molding composition according to claim 1 wherein said flame retardancy is V-0 according to Underwriters Laboratories Test No. 94.

9. A flame retarded resin molding composition according to claim 1 wherein said flame retardant is a poly (haloarylmethacrylate), halogenated polystyrene or a poly (haloarylacrylate) flame retardant.

10. A flame retarded resin molding composition according to claim 9 wherein said flame retardant is a polybromobenzylacrylate flame retardant.

11. A flame retarded resin molding composition according to claim 1 wherein mineral filler comprises a metal sulfate, talc, clay, mica, or wollastonite.

12. A flame retarded resin molding composition according to claim 11 wherein mineral filler comprises a talc.

13. A flame retarded resin molding composition according to claim 11 wherein mineral filler comprises a metal sulfate of Group IA and Group IIA metal.

14. A flame retarded resin molding composition according to claim 1 wherein said resin molding composition includes a reinforcing material.

15. A flame retarded resin molding composition according to claim 1 wherein said reinforcing material comprises glass fiber material.

16. A flame retarded resin molding composition according to claim 1 wherein said olefinic polymer comprises a copolymer of ethylene and an alkyl acrylate or alkylmethacrylate ester.

17. A flame retarded resin molding composition according to claim 16 wherein said olefinic polymer is present in an amount from about 3 to about 10 percent by weight.

18. A flame retarded resin molding composition according to claim 17 wherein said olefinic polymer is an addition polymer selected from the group consisting of the addition polymers of ethylene, propylene, butylene, hexene, octene and mixtures thereof.

19. An article molded from the flame retarded resin molding composition according to claim 1.

20. An electrical circuit breaker device prepared using the composition of claim 1.

21. An electrical circuit breaker device prepared using the composition of claim 2.

* * * * *